March 14, 1961 J. JAOUEN 2,974,530
ANGULAR VELOCITY METER
Filed May 22, 1958 5 Sheets-Sheet 2
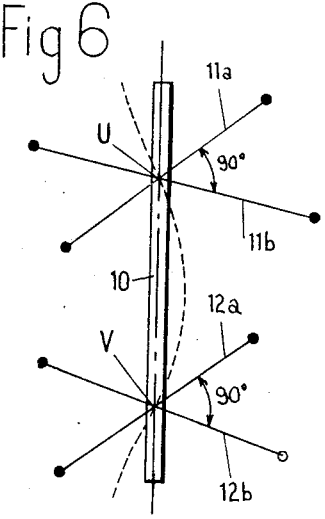
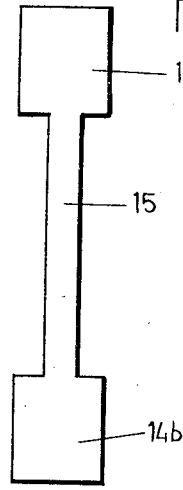
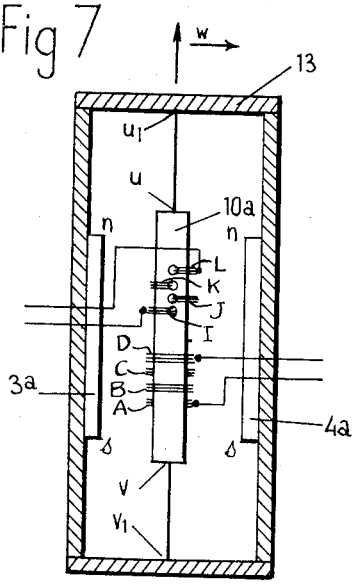
Inventor:
Jean Jaouen
by: Michael S. Striker
Attorney March 14, 1961  J. JAOUEN  2,974,530
ANGULAR VELOCITY METER
Filed May 22, 1958  5 Sheets-Sheet 3
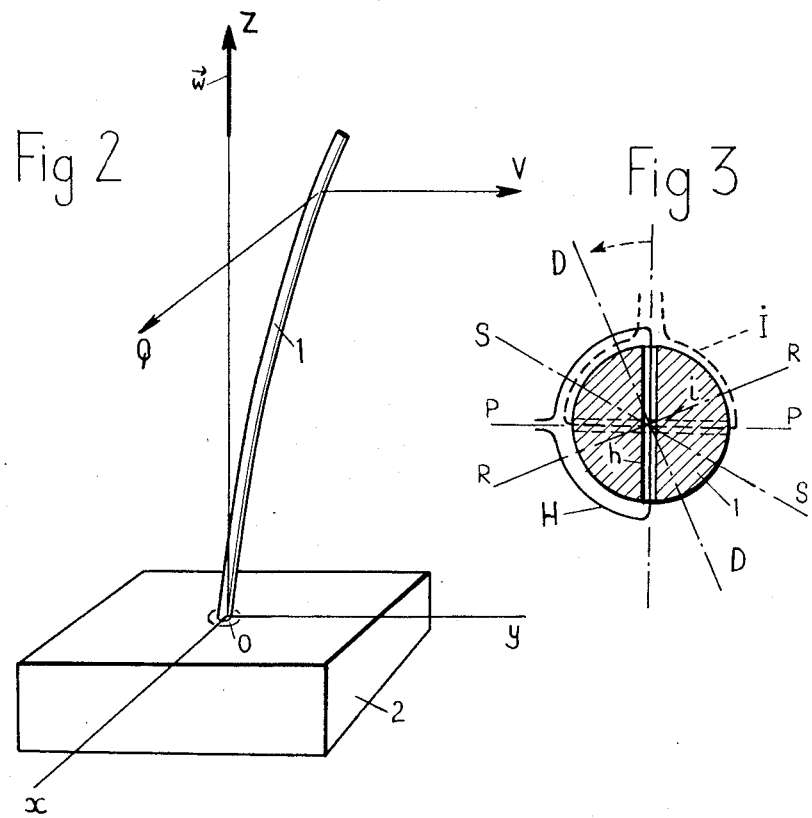
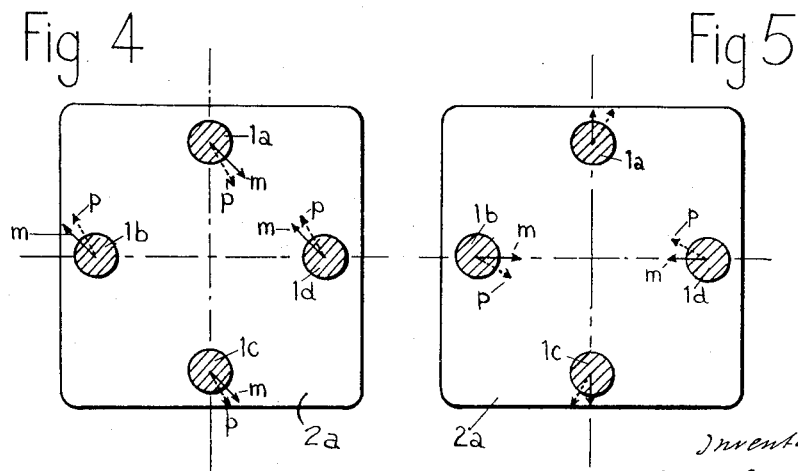
Inventor:
Jean Jaouen
by: Michael S. Strike
Attorney

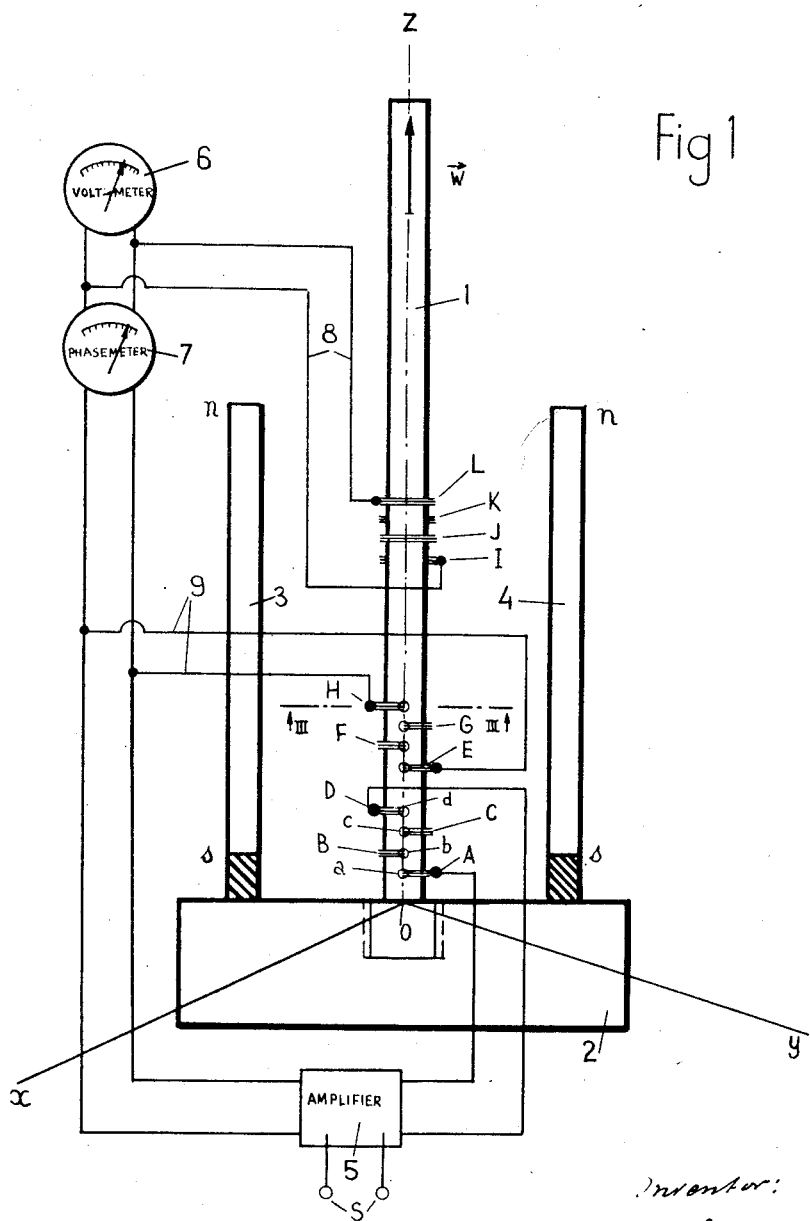

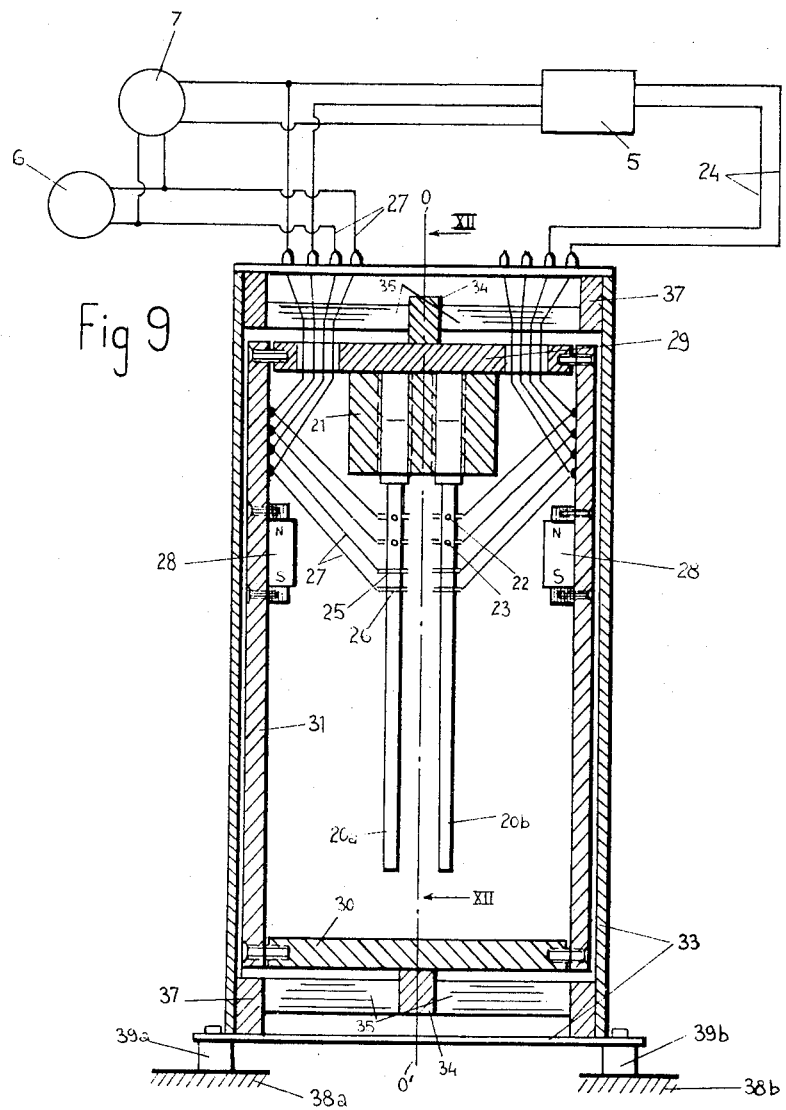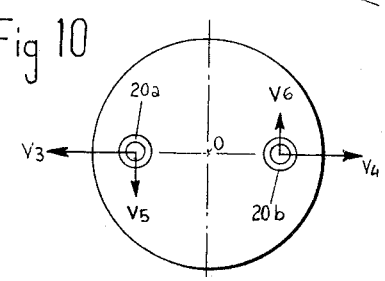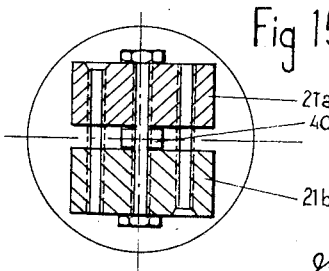

March 14, 1961 J. JAOUEN 2,974,530
ANGULAR VELOCITY METER
Filed May 22, 1958 5 Sheets-Sheet 5
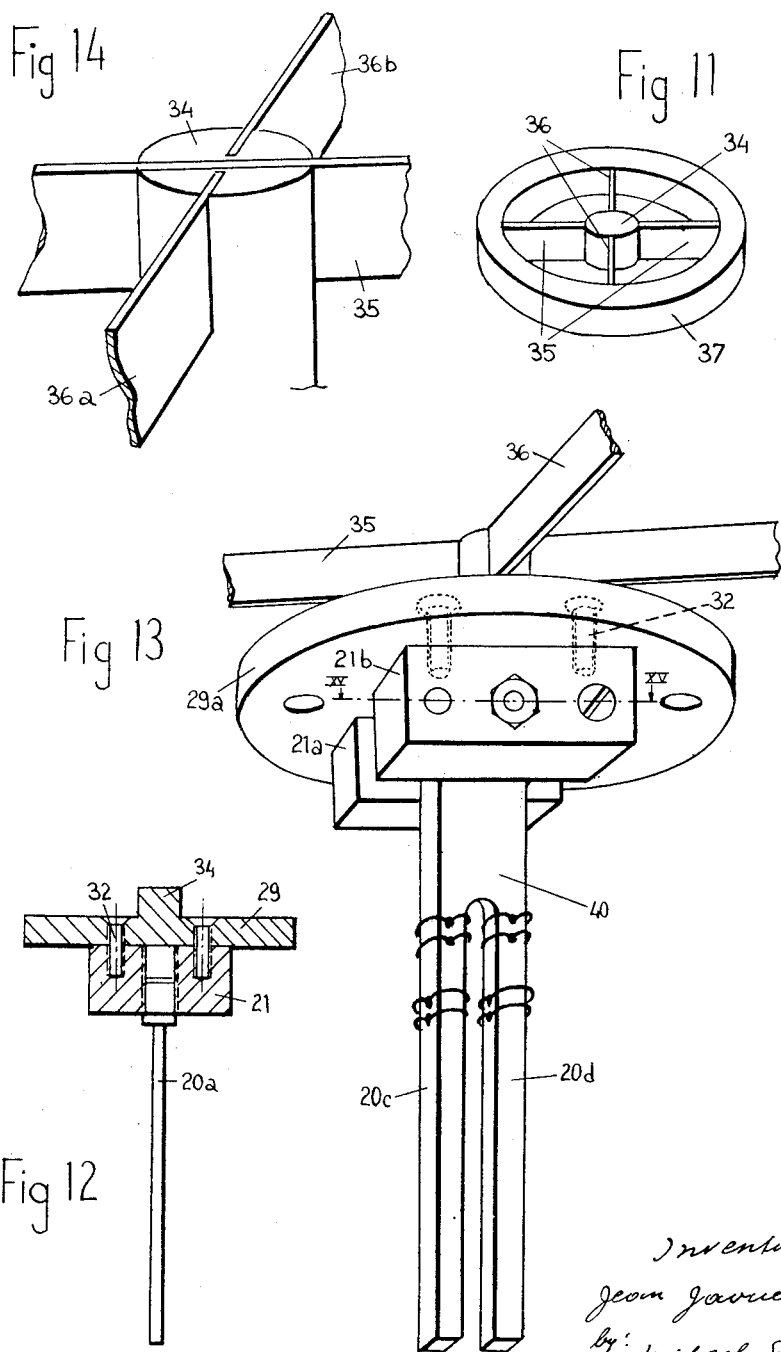

United States Patent Office 2,974,530
Patented Mar. 14, 1961

2,974,530
ANGULAR VELOCITY METER

Jean Jaouen, Neuilly-sur-Seine, France, assignor to Bronzavia, Courbevoie, France, a company of France Filed May 22, 1958, Ser. No. 737,122

Claims priority, application France May 24, 1957

11 Claims. (Cl. 73—505)

This invention relates to apparatus for measuring angular velocities of moving objects, vehicles or craft, and more especially to such apparatus which rely on the so-called Coriolis inertia forces developed in objects in angular motion for deriving and indication of angular velocity.

Objects of the invention are to provide such apparatus which will be relatively simple to make, small in size and weight so as to be conveniently applicable to aircraft and the like, rugged, and yet sensitive and accurate.

When a vibratory element is vibrated relatively to a support, the support may be considered as providing a relative reference system which in turn may be displaced over any path of motion, e.g. a rotational path, relatively to the so-called Galilean reference system which is a coordinate system having the Earth's center as origin and coordinate axes determined by the fixed stars. In such a composite system it is well-known that the mechanical phenomena occurring in the relative reference system may be described by the same mechanical laws as would apply in the case of Galilean axes, provided one introduces into the equations, in addition to the forces actually applied, i.e. the vibration-generating forces and the resulting reactions on the support, an ideal or fictive force called the Coriolis inertia force.

For a small element of mass $m$ of the vibratory element, the Coriolis force may at any instant be represented in accordance with the conventional symbolism used in dynamics, as a vector which is the vector product of two vectors: one is the rotation vector of the relative reference system with respect to the Galilean system; and the other vector is $(-2m)$ times the vector representing the resultant velocity of the element of mass $m$ under consideration, with respect to the relative reference system fixed to the support.

The net result of the Coriolis inertia forces is that, on rotation of the support of the vibratory element, the relative plane in which the element is vibrating is displaced from the vibrational plane corresponding to any different rotational velocity of the support and of course is displaced from that plane in which the element would be vibrating if the rotational velocity were zero. The displacement increases as the angular velocity of rotation increases since the Coriolis forces are correspondingly increased. As to the direction of such displacement, this is such that, where the support is rotating in one direction, the resulting plane of vibration is displaced in a reverse direction from the initial relative plane of vibration.

The above basic principles, well-known in dynamics, are put to advantage according to the invention in providing an improved angular velocity meter as will presently appear. An exemplary embodiment of the invention will now be disclosed by way of illustration but not of limitation with reference to the accompanying drawings, wherein:

Fig. 1 is a diagrammatic illustration of a first embodiment of the invention;

Fig. 2 is a corresponding simplified diagram, in perspective, illustrating a vibrating rod displaced from its neutral position;

Fig. 3 is a section on line III—III of Fig. 1, showing details of the construction and operation of the apparatus according to the embodiment shown in Fig. 1;

Figs. 4 and 5 are diagrammatic cross sections relating to apparatus according to another embodiment of the invention;

Figs. 6 and 7 are diagrammatic views in elevation showing a third embodiment of the invention;

Fig. 8 is an elevational view of a vibratory rod in accordance with a modified embodiment for use in a system according to the invention;

Fig. 9 is a simplified general view in section, with parts in circuit schematic form, of an angular rate meter according to a fourth embodiment of the invention;

Fig. 10 is an explanatory diagram illustrating the operation of a vibratory rod in Fig. 9;

Fig. 11 is a detailed view in perspective showing an element of Fig. 9;

Fig. 12 shows another detail on line XII—XII of Fig. 9;

Fig. 13 is a partial view of a modified construction of a set of two vibratory rods;

Fig. 14 is an enlarged view relating to a detail of Fig. 13; and

Fig. 15 is a partial view on line XV—XV of Fig. 13.

In accordance with the invention the angular velocity of an object, vehicle or craft displaced in a rotary motion of any desired character in space, is measured through electromagnetic measurement of the Coriolis inertia forces applied to at least one flexional vibratory element mechanically connected with said object, vehicle or craft. The vibratory element is vibrated through magnetostriction and the element is of isotropic character, that is to say, it is possessed of similar flexional vibratory characteristics in all transverse directions. The isotropic vibratory element will be referred to for convenience herein as a "rod," though it should be understood that vibratory elements of other than rod-like configuration may be used provided the elements display the desired isotropic character.

In this connection, it is noted that one condition sufficient to ensure that a flexionally vibrating element is isotropic, is that in each transverse cross section of the elements the moments of inertia with respect to any straight line intersecting the center of inertia of the section and contained within the plane of said section, are the same.

One especially simple instance of an isotropic vibratory element is that of a cylindrical bar, rod, or reed of circular cross section. It is such configuration of the vibratory element that has been illustrated in the various drawings, except in Fig. 8, wherein the various transverse sections are shown circular but having varied radii in some of the transverse sections, and excepting also Figs. 13 and 14 wherein the vibratory rod has a square cross section.

The use of an isotropic flexional vibratory element has an important advantage over vibratory elements of other characters as used in some known systems involving the utilization of Coriolis inertia forces, in that the natural transverse vibration frequency of such an isotropic element is the same in all planes in which it can be made to vibrate in the various modes of which the element is capable, so that the element will be in resonance for all transverse vibrational modes thereof. As a result of this the amplitude of vibration of an isotropic element will in nearly all cases be consistently greater than that of a non-isotropic element of otherwise similar characteristics. This is one of the advantages afforded by the invention.

As regards the manner in which the isotropic vibratory element or rod is vibrated in flexion, the means adopted for this purpose according to the invention are magnetostrictive in character. Magnetostrictive means have various advantages as a means of vibrating the isotropic vibrating element in a device according to the invention, especially in that they permit of constructing extremely simple and accurate units.

In the form of embodiment shown in Figs. 1 and 2, a single vibratory element or rod 1 is used, in the form of a cylindrical body of revolution, having one of its ends securely fitted into a base 2. The inserted portion may, if desired, have a cross sectional shape and size differing from that in the free length of the element. The vibratory element is made of magnetostrictive material, usually metallic (e.g. the alloy Elinvar) and having a predetermined magnetic permeability. The element is positioned in a magnetic field created e.g. by the two permanent bar magnets 3 and 4 having their north poles N and their south poles S respectively positioned opposite to each other on opposite sides of the element.

The vibratory element or rod 1 is formed with a first set of diametrically extending transverse holes or bores such as $a$, $b$, $c$, $d$, parallel to one another and normal to the mid-axis of the element, i.e. herein the axis of this body of revolution. A fine insulated wire conductor is passed through the holes to provide a winding. Thus, there is threaded through each hole one or preferably several turns A, B, C, D of the wire which are looped around the outer periphery of the rod, such loops being all formed on the same side of the rod as regards a given one of the holes, but the loops being arranged on alternating sides of the rod as from one hole to the next. Thus, the loops relating to all the holes of odd denomination may be positioned on one side of the rod and the loops relating to the holes of even denomination on the opposite side. This arrangement cooperates with the effect of the bar magnets 3 and 4 and with the sense of current flow through the winding turns positioned on one and the opposite side of the rod to impart flexional magnetostrictive vibrations to the rod when to the winding an A.-C. voltage is applied of a suitable frequency corresponding to the fundamental mode frequency of the vibratory rod, or to one of the partial-mode frequencies thereof. It is to be noted that the partial-mode frequencies of the vibratory element are not necessarily the same as the harmonics of the fundamental frequency.

The rod when thus excited vibrates in transverse flexion in a plane normal to the plane defined by the bores $a$, $b$, $c$, $d$, and with a high resonant amplitude.

The exciting alternating voltage may be supplied from an auxiliary generator. According to a preferred arrangement however the vibratory element may be connected to provide an electromechanical self-oscillator device. For this purpose, there may be provided a winding E—F—G—H parallel to the first above mentioned winding A—B—C—D, and the two windings may be interconnected to one another in a positive feedback loop by way of an amplifier 5 energized from a voltage supply source S providing the necessary vibratory energy. Such an arrangement makes it possible to impart sustained vibrations to the element without the use of separate oscillation generating means.

Now, supposing a bodily displacement is imparted to the entire assembly thus described, such displacement involving a rotational component of angular velocity $w$ on the Oz axis which is the center line of the element in non-vibrating condition, see Fig. 2, then the Coriolis inertia force Q acts to displace the relative plane in which the element was initially vibrating, by an amount that increases with the magnitude of the angular velocity $w$. The sense and magnitude of the displacement of the relative vibratory plane are then indicated by suitable electric indicator means shown herein as a voltmeter 6 and phase-meter 7, arranged and connected in a manner to be presently described in detail.

Initially, i.e. with the support in stationary condition, the vibratory plane is the plane indicated as PP in Fig. 3 and is normal to the plane of the bores $a$—$b$—$c$—$d$ as previously stated. When however the angular velocity component $w$ assumes a non-zero value, the relative vibratory plane is displaced to a position such as RR. The line DD in the figure indicates the diameter normal to the plane RR, which is the trace of the neutral plane of the flexed rod, containing those fibres of the rod that are stressed neither in tension nor in compression.

With the rod subjected to the action of a permanent longitudinal magnetic field from the bar magnets 3 and 4, and since the rod is made from magnetostrictive material, the flexional vibrations of the rod result in the so-called Villari effect: that is, there is a variation in the magnetic flux lines respectively in each of the half-sections of the rod to either side of the said diameter DD. The flux variations in the two sections are equal in magnitude and reverse in sign, and the magnitude of the flux variations increases as the displacement between the planes RR and PP increases. Consequently, the alternating voltage as measured by instrument 6 will increase with the angular displacement and hence with the angular velocity of rotation of the system. If nothing more than the magnitude of said angular velocity is required, i.e. if the sense of rotation is known, then the system just described provides the requisite indication.

However, if the sense of the rotation is also required to be indicated, then the fact is made use of that the alternating flux variations in two turns of winding such as H and I respectively (see Fig. 3) are in phase if the relative vibratory plane has been shifted in one sense as for example to the position R—R; and are in phase opposition if the plane is shifted in the opposite sense as to the position S—S. As a result, the indicated sense of the phase displacement between the exciter windings E—F—G—H which are connected to leads 9 (Fig. 1), or the windings A—B—C—D on the one hand, and the windings I—J—K—L connected to output leads 8 on the other hand, will provide an indication of the sense of the angular velocity of the moving system. This phase sense may be indicated by a phase-meter as shown at 7 in Fig. 1.

In the exemplary embodiment just described with reference to Figs. 1 to 3, a single vibratory element is used which is fixed at one end. Such a system will usually require the provision of a relatively heavy base support because of the high transverse reactions developed in the support by the vibrations. This may in some cases be undesirable, and embodiments of the invention may then be used which are illustrated diagrammatically in Figs. 4 and 5, or in Figs. 7 and 8, or in Figs. 9 to 13, which latter embodiment appears to be most desirable.

In the embodiment of Figs. 4 and 5, four identical vibratory elements or rods $1a$, $1b$, $1c$ and $1d$ are arranged with their one ends secured in a common support $2a$, at the apices of a square.

The full-line arrows $m$ indicate the vibrations imparted to the four rods at any given moment of time under the action of the magnetostrictive forces, with the support $2a$ stationary. The vibrational velocities are equal in absolute value and are of opposite sign in pairs, as shown by the directions of the arrows, so that the transverse reactions developed in the base $2a$ are balanced and cancel out.

When the support $2a$ is rotated the mean planes of vibration for the four rods are angularly shifted by the same amount in the same direction. The dotted-line arrows $p$ indicate the corresponding vibrational velocities at a given instant for a given bodily angular velocity of the support $2a$. It is seen that the transverse reactions set up in the base 2a still form a balanced system and cancel one another out.

A modified version of this embodiment is shown in Fig. 5. Here the adjacent rods are made to vibrate in planes that are normal to one another rather than parallel as in Fig. 4. Thus, the initial planes of vibrations are indicated by the chain lines as coinciding with the two diagonals of the square defined by the four rods, whereas in the case of Fig. 4 the initial vibratory planes were directed along the sides of the said square as shown by the arrows $m$ in Fig. 4. Returning to the embodiment of Fig. 5, during the time that two opposite ones of the vibrating rods are moving inwards towards the center of the square, the other two rods are moving outwards. It is then seen from the arrows $m$ and $p$ that the transverse reactions developed in base 2a again cancel out regardless of the rotational speed of the system.

Turning now to Figs. 6 and 7, an embodiment of the invention is shown wherein the vibratory element or rod rather than being fixed at one end as in Figs. 1 and 2, is a freely suspended element. It is known that if a rod or the like which is freely suspended so as to be flexionally vibratable is transversely vibrated in its fundamental frequency, the rod 10 will display two vibrational nodes U and V. Hence, the element may be suspended or supported at the two nodal points U and V thereof, as from thin wires for example, and still be permitted to vibrate freely in all directions, while the suspension means or wires will at the same time carry the rod bodily therewith in any rotary motion that may be imparted to the supporting means therefor. In Fig. 6, there are shown two crossed pairs of suspending wires 11a—11b and 12a—12b, which extend through crossed bores formed in the element 10 at the vibrational node points U and V thereof.

Instead of using the cross-wire suspending means of Fig. 6, the vibratory element 10a may be supported through two thin rods of resilient metal, such as spring-steel needles, respectively welded as at $u$ and $v$ to the ends of the vibrating element, and at $U_1$ and $V_1$ to the supporting frame 13 of the system as shown in Fig. 7. The bar magnets 3a and 4a in this embodiment are then preferably carried by the uprights of the supporting frame 13. The windings such as A—B—C—D on one hand and I—J—K—L on the other may be connected in a manner similar to that described with reference to Fig. 1.

A system as just described is not only applicable to cases where the element is vibrated at its fundamental frequency mode, but likewise in the case of vibrations in partial frequency modes. For this purpose the suspending wires or rods need simply be positioned at the corresponding nodal points of the element.

While in all of the embodiments herein described it is to be understood that the vibratory element or elements used are isotropic in the sense defined above, said elements need not necessarily be cylindrical in form. Thus Fig. 8 shows an example wherein the element comprises three cylindrical sections, with the end sections 14a and 14b being of larger diameter than the central section 15. Such a shape will reduce the vibratory frequency of the element for a given mode without increasing the longitudinal dimensions as compared to a cylindrical element of equal radius throughout.

The embodiments in Figs. 9 to 15 relate to devices according to the invention comprising two vibratory elements. In the form shown in Figs. 9 and 10 the vibratory elements 20a and 20b are of circular cross section as is apparent from Fig. 10.

Each element at one end is firmly secured to a base 21. In the form shown in Fig. 9 the elements are threaded into tapped sockets in the base, however this is not essential and the elements may be secured by welding, brazing, solder, or force-fit into a socket of the base. The other ends of the elements are free.

The magnetostrictive material forming the elements should preferably be so selected that its thermal expansion coefficient and the thermal coefficient of variation of its elastic modulus are substantially zero. One suitable material in this connection is the alloy known as Elinvar which contains iron, nickel, chromium and tungsten as the major constituents in it.

For vibrating the elements in the fundamental mode each element is formed with a set of transverse diametric holes or bores 22—23 parallel to one another and normal to the axis of the corresponding element. These bores generally correspond in function to bores $a$—$b$—$c$—$d$ of Fig. 1. Extending through the passages are windings as described with reference to Figs. 1 and 3, which are connected via lines 24 with a source of energization by alternating voltage preferably in a positive feedback loop including an amplifier 5 so as to provide a self-oscillating system as already described.

For detecting the secondary vibrational effects in the elements produced by motion of the base 21 including an angular velocity component, the elements are further formed with bores or passages 25—26 normal to bores 22, 23 and corresponding in function to the bores $i$—$j$—$k$—$l$ accommodating the windings I, J, K, L, respectively, of Fig. 1. The winding turns passed through the bores are connected by leads 27 in a circuit including e.g. a voltmeter 6 and a phase-meter 7 for indicating the magnitude and sense of the angular velocity in a manner similar to that described with reference to Fig. 1.

The elements are magnetically polarized by a permanent longitudinal field generated by magnets 28 positioned in a casing 31, with the N and S poles positioned in opposed relation as shown.

The base 21 is rigidly secured to a circular plate 29 forming one end of a rigid cylindrical casing having a side wall 31 and an opposite end plate 30. Fig. 13, while relating to a modification of Fig. 9, clearly shows in perspective the manner in which a base element 21a—21b generally similar to the base 21 in Fig. 9, may be positioned and secured with screws 32 to a circular plate 29a similar to plate 29 in Fig. 9.

The cylindrical casing 29—30—31 which thus has rigidly secured to it one end of each of the vibratory elements 20a and 20b, is preferably made of non magnetic material such as brass. The casing is inserted into an outer casing 33 which thus encloses the vibratory elements of the apparatus. The mechanical connection between inner casing 29—30—31 and outer casing 33 preferably takes the form of a special semi-rigid elastic structure now to be described.

The connecting and retainer structure is of resilient character so as to take any residual unbalanced vibrations that may not be cancelled out as between the two vibrating elements, and thus transmitted from the elements to the inner casing. Moreover, said structure is semi-rigid in character so as to transmit to the outer casing and to the fixed ends of the vibratory elements any external motions having an angular velocity component to be measured by the apparatus.

For this purpose, the connecting the retainer structure proferably comprises, adjacent each of the opposite bases 29 and 30 of the inner casing, a pair of metal strips or bands, e.g. steel, arranged in right-angled crossed relationship.

Each circular end plate 29 and 30 of the inner casing includes a central hub member 34 directed outwardly of the casing and preferably of solid construction. The hub member has connected to it a first metal band 35 visible in Fig. 9, as by inserting the ends of two separate band sections into slots formed in opposite sides of the hub. Another similar metal band is secured to the hub normally to the first band, e.g. by the same device of inserting the ends of two band sections into opposite slots in the hub. The second band is not visible in Fig. 9 but appears as band 36 in Fig. 11, and is shown as 36, in Fig. 13 and as 36a, 36b in Fig. 14 which relate to a somewhat modified arrangement.

The outer ends of metal bands 35 and 36 are rigidly secured to the outer casing 33 e.g. through one or more retainer members, such as the retainer ring 37 in Fig. 9.

It will be understood that the mechanical connection thus provided between inner casing 29—30—31 and outer casing 33 has the requisite dual characteristic of being resilient for taking up the vibrations and semi-rigid so as to transmit the main movements of non-vibratory nature imparted to the system as a whole.

Such an arrangement is made necessary by the fact that the secondary vibration asumed by any one of the vibratory elements when the apparatus including casing 33 has imparted to it a motion involving an angular velicity component, is not fully balanced out by the corresponding secondary vibration assumed by the other element, as will now be made clear with reference to Fig. 10, and despite the precautions previously described in respect to the relative moments of inertia of the pair of vibratory elements considered as a whole, and of the inner casing 29—30—31.

The main vibration of elements 20a and 20b is the vibration deliberately imparted thereto by the magnetic means described. This vibration is such that, at any instant of time the corresponding velocities V3 and V4 in the vibratory displacement are equal and opposite so that the corresponding reactions in the base cancel out as already explained. However, the elements also have a secondary vibration component assumed when the apparatus is bodily displaced with angular motion, and this secondary vibration is that resulting from the action of the Coriolis forces, and gives rise at any instant to a vibrational velocity component V5 (Fig. 10) which is directed reversely relative to the corresponding velocity component V6 assumed by the other rod element at the same instant. The corresponding reactions therefore form a couple with respect to the axis OO' of the inner casing, which axis is an axis of symmetry for the two vibrating elements. This couple tends to rotate the casing 29—30—31 about the axis OO'. However, since the velocities V5 and V6 and the corresponding reaction forces are alternating in character, the resulting couple, as a net result, tends to set up an angular vibration of the casing 29—30—31 supported in the crossed spring bands 35—36.

Because of the provision, at the fixed ends of the vibratory elements, of a rigid connection with the casing 29—30—31 which has a much larger moment of inertia with respect to axis OO' than the inertia moment of the elements 20a—20b, the vibratory angular movement thus imparted to the casing is kept down to a very low amplitude value. The laws of mechanics show that the motion imparted to casing 29—30—31 by a secondary vibration of elements 20a and 20b having a given amplitude, will be increasingly small as the ratio of the moment of inertia of casing 29—30—31 to that of the pair of elements 20a—20b with respect to axis OO', is large. Now the casing 29—30—31 is deliberately designed to have a high inertia moment, preferably greater than 50 times the moment of inertia of the combined pair of elements, and preferably still, greater than 300 times the moment of the combined pair of elements. The latter moment of inertia is, of course, the lower as the two vibratory elements 20a—20b are arranged closer to the axis OO'.

As a result of the measures thus described, the angular vibration imparted to casing 29—30—31 due to the secondary vibration component of the elements is held down to a very low amplitude. Such residual vibration of the casing is easily taken up by the semi-rigid, locally-elastic, mechanical connecting structure interposed between said casing and the outer casing of the apparatus as above described. And the said local elasticity or resiliency of the connecting structure has the still further advantage that the vibration of the elements is not damped as would otherwise be the case if the elements were rigidly fixed with respect to the measuring apparatus itself subjected to the external motion involving variations in angular velocity, even if further resilient damping means were provided between the vibratory elements and said apparatus.

It will, moreover, be understood that even though the resilient suspension bands do not substantially oppose the angular vibration of the casing 29—30—31, such bands still are stiff enough to cause the casing and elements therein, to be carried bodily with the outer support, such as a craft on which the apparatus is mounted, in the motions of the craft. In Fig. 9 portions of the carrier craft structure are indicated at 38a—38b, and the outer casing is attached thereto by way of a shock-proof mounting such as rubber blocks 39a—39b.

As previously stated the vibratory elements 20a and 20b and their anchoring parts including base 21 and any screw or the like means serving to lock the elements thereon, are preferably made of a metal having substantially zero thermal expansion coefficient and thermal elasticity modulus coefficient. This is desirable in order that the fundamental and secondary mode vibration frequencies will not vary during use of the apparatus. Otherwise, variations in clearance in the attachment of the vibratory elements in the base, caused by thermal expansion and contraction in the element anchoring means, would be capable of causing such frequency variations if such expansions and contractions were allowed to occur due to the nature of the metals used.

As regards the action of the various windings associated with the vibratory elements, this is the same as the action of the corresponding windings in the embodiment of Figs. 1 and 3 previously described. More specifically the windings passed through the bores or passages 22 and 23 in each element, serve to sustain the main vibration of the elements under the effect of the A.C. voltage applied to said windings. The windings associated with the passages 22 and 23 in element 20a serve to sustain the main vibration, and may be supplied from an auxiliary generator or preferably as described with reference to preceding figures, they may be connected in a feedback loop with the corresponding windings in the other element 20a through an amplifier 5.

The two windings 25 and 26 of one of the elements, herein element 20a, serve to pick up the secondary vibration occurring in said element transversely to the main vibration component, when the support 38a—38b is subjected to a rotational displacement of any character, and to furnish a corresponding electric signal indicated on the instruments 6 and 7 as heretofore described. The corresponding windings 25—26 on the other element 20b has as one function to establish mechanical symmetry between both elements 20a and 20b, but they would be superfluous for detecting the secondary vibration. However, their presence is very desirable for fine tuning adjustment of the secondary vibration frequency in relation to the main vibration frequency by a method hereinafter described in detail. It may be indicated at this point that the said tuning method serves to impart a more perfectly isotropic character to the vibratory elements, since such a character cannot be readily obtained simply by initially machining the elements, no matter how thorough the machining. The isotropic character of each element can only be said to be perfect in cases where the secondary vibration frequency (transverse of the main vibration) is equal to the frequency of the main vibration, which condition is necessary and sufficient.

According to the invention, the main vibration frequency is first measured. Then the resonant frequency of the secondary vibration is independently measured, prior to any adjustment. For this purpose the windings 25 and 26 of element 20b are used, and the corresponding windings of element 20a. Thus, the windings 25—26 of element 20b may be excited with an auxiliary generator delivering an A.C. voltage. The generator frequency is varied until a maximum voltage is indicated across the terminals of the corresponding winding 25—26 of element 20a, and the frequency corresponding to this maximum condition is measured.

It is usually found that this frequency differs slightly from the main vibration frequency. The frequencies are then adjusted to reduce the difference between them as by slightly grinding the ends of the elements adjacent their fixed ends. The grinding is effected so as to reduce the moment of inertia of the transverse cross section of the element with respect to the direction normal to the plane of the higher-frequency one of the two vibrations.

In the exemplary embodiment shown in Fig. 13 the two elements 20c and 20d are machined integrally out of a common unitary block of metal as shown by the common base block 40 of both elements. The unit 20c—20d—40 is therefore similar to a conventional tuning fork, except however that in it the main and secondary vibrations (which as indicated above are in planes perpendicular to one another) are equal.

In the embodiment of Fig. 13 the common base 40 of both vibratory elements is secured to a circular plate 29a similar to plate 29 in Fig. 9 by way of base blocks 21a and 21b (Figs. 13 and 14), while the remaining assembly is similar to that described with reference to Figs. 9 to 12.

It will be apparent from the foregoing disclosure that the invention in its various embodiments described achieves the objects assigned to it in that it provides an angular velocity measuring apparatus, for a moving object or craft, which is relatively simple to construct, is small in size and weight, a feature that is especially desirable in connection with aircraft, is rugged, and is sensitive and accurate, the last mentioned characteristics being chiefly due to the fact that the device is normally operated at resonance.

It will be understood that the invention may be embodied in various forms other than those illustrated and described herein and that various modifications may be made in the constructional details thereof by those familiar with the art within the scope of the ensuing claims.

What I claim is:

1. In a device for measuring the angular velocity of a moving structure, in combination, a support member movable with said structure; at least one elongated isotropic vibratory element capable of flexional vibration in any plane extending through its unflexed longitudinal axis, said element being mounted on said support member with freedom to carry out such flexional vibration and being made of magnetostrictive material; magnetic means mounted in fixed relation to said support member for creating a polarizing permanent magnetic field extending longitudinally of said element; electromagnetic input means operatively connected with said element for producing said vibration in a predetermined plane through magnetostriction in interaction with said polarizing field, said electromagnetic input means including a plurality of series-connected windings located respectively in spaced planes transversal of said longitudinal axis, each winding being composed of a first portion extending transversally through said axis and a second portion surrounding substantially one-half of the periphery of said element in the transversal plane containing said first portion, said second portions of consecutive ones of said windings being alternatingly applied to opposite peripheral portions of said element, said element being provided with a plurality of transversal passages all located in a common plane extending through said unflexed longitudinal axis and perpendicularly to said predetermined plane for accommodating said first portions of said windings, respectively; electromagnetic output means operatively connected with said element for detecting, on the basis of magnetostrictive reaction of said element, flexional vibration of said element in a plane perpendicular to said predetermined plane, said electromagnetic output means including a plurality of series-connected windings located respectively in spaced planes transversal of said longitudinal axis, each winding being composed of a first portion extending transversally through said axis and a second portion surrounding substantially one-half of the periphery of said element in the transversal plane containing said first portion, said second portions of consecutive ones of said windings being alternatingly applied to opposite peripheral portions of said element, said element being provided with a plurality of transversal passages all located in a common plane extending through said unflexed longitudinal axis and perpendicularly to said common plane containing said transverse passages associated with said input means, for accommodating said first portions of said windings, respectively; driving means connected with said input means for energizing the latter; and indicator means connected with said output means for indicating the amplitude and phase condition of voltages induced in said output means, whereby in the case of any angular movement of the structure about an axis parallel with said unflexed longitudinal axis of said element the angular velocity is indicated by said indicator means on the basis of the detection of a component of the flexional vibration of said element in a plane perpendicular to said predetermined plane.

2. In a device for measuring the angular velocity of a moving structure, in combination, a support member movable with said structure; at least one elongated isotropic vibratory element capable of flexional vibration in any plane extending through its unflexed longitudinal axis, said element being mounted on said support member with freedom to carry out such flexional vibration and being made of magnetostrictive material; magnetic means mounted in fixed relation to said support member for creating a polarizing permanent magnetic field extending longitudinally of said element; electromagnetic input means operatively connected with said element for producing said vibration in a predetermined plane through magnetostriction in interaction with said polarizing field, said electromagnetic input means including a plurality of series connected windings located respectively in spaced planes transversal of said longitudinal axis, each winding being composed of a first portion extending transversally through said axis and a second portion surrounding substantially one-half of the periphery of said element in the transversal plane containing said first portion, said second portions of consecutive ones of said windings being alternatingly applied to opposite peripheral portions of sad element, said element being provided with a plurality of transversal passages all located in a common plane extending through said unflexed longitudinal axis and perpendicularly to said predetermined plane for accommodating said first portions of said windings, respectively; electromagnetic output means operatively connected with said element for detecting, on the basis of magnetostrictive reaction of said element, flexional vibration of said element in a plane perpendicular to said predetermined plane, said electromagnetic output means including a plurality of series-connected windings located respectively in spaced planes transversal of said longitudinal axis, each winding being composed of a first portion extending transversally through said axis and a second portion surrounding substantially one-half of the periphery of said element in the transversal plane containing said first portion, said second portions of consecutive ones of said windings being alternatingly applied to opposite peripheral portions of said element, said element being provided with a plurality of transversal passages all located in a common plane extending through said unflexed longitudinal axis and perpendicularly to said common plane containing said transverse passages associated with said input means, for accommodating said first portions of said windings, respectively; second electromagnetic output means operatively connected with said element for inductively responding to said flexional vibration produced by said input means, said second electromagnetic output means including a plurality of series-connected windings located respectively in spaced planes transversal of said longitudinal axis, each winding being composed of a first portion extending transversally through said axis and a second portion surrounding substantially one-half of the periphery of said element in the transversal plane containing said first portion, said second portions of consecutive ones of said windings being alternatingly applied to opposite peripheral portions of said element, said element being provided with a plurality of transversal passages all located in a common plane extending through said unflexed longitudinal axis and perpendicularly to said predetermined plane for accommodating said first portions of said windings, respectively; circuit means including amplifier means having input terminals connected to said second output means, and output terminals connected to said input means to provide a feed-back loop for effecting said vibration in said predetermined plane; power supply means connected to said amplifier means for causing through said amplifier means electrical oscillations in said feed-back loop; and indicator means connected with said output means for indicating the amplitude and phase condition of voltages induced in said output means, whereby in the case of any angular movement of the structure about an axis parallel with said unflexed longitudinal axis of said element the angular velocity is indicated by said indicator means on the basis of the detection of a component of the flexional vibration of said element in a plane perpendicular to said predetermined plane.

3. In a device for measuring the angular velocity of a moving structure, in combination, a support member movable with said structure; a pair of elongated isotropic vibratory elements each capable of flexional vibration in any plane extending through its unflexed longitudinal axis, said elements each being mounted parallel with, and spaced from, each other on said support member with freedom to carry out such flexional vibration and being made of magnetostrictive material; magnetic means mounted in fixed relation to said support member for creating a polarizing permanent magnetic field extending longitudinally of said elements; electromagnetic input means operatively connected with each of said elements for producing said vibration in a predetermined plane but in respectively opposite directions through magnetostriction in interaction with said polarizing field, said electromagnetic input means including a plurality of series-connected windings located respectively in spaced planes transversal of said longitudinal axis, each winding being composed of a first portion extending transversally through said axis and a second portion surrounding substantially one-half of the periphery of said element in the transversal plane containing said first portion, said second portions of consecutive ones of said windings being alternatingly applied to opposite peripheral portions of said element, said element being provided with a plurality of transversal passages all located in a common plane extending through said unflexed longitudinal axis and perpendicularly to said predetermined plane for accommodating said first portions of said windings, respectively; electromagnetic output means operatively connected with at least one of said elements for detecting, on the basis of magnetostrictive reaction of said element, flexional vibration of said element in a plane perpendicular to said predetermined plane, said electromagnetic output means including a plurality of series-connected windings located respectively in spaced planes transversal of said longitudinal axis, each winding being composed of a first portion extending transversally through said axis and a second portion surrounding substantially one-half of the periphery of said element in a transversal plane containing said first portion, said second portions of consecutive ones of said windings being alternatingly applied to opposite peripheral portions of said element, said element being provided with a plurality of transversal passages all located in a common plane extending through said unflexed longitudinal axis and perpendicularly to said common plane containing said transverse passages associated with said input means, for accommodating said first portions of said windings, respectively; driving means connected with said input means for energizing the latter; and indicator means connected with said output means for indicating the amplitude and phase condition of voltages induced in said output means, whereby in the case of any angular movement of the structure about an axis parallel with said unflexed longitudinal axis of each of said elements the angular velocity is indicated by said indicator means on the basis of the detection of a component of the flexional vibration of said element in a plane perpendicular to said predetermined plane.

4. A device as claimed in claim 3, wherein both elements of said pair of elements are provided with said output means, the output means of one of said elements being connected to terminals separate from the output means of the other one of said elements, for applying through said terminals an outside alternating potential of frequency variable within a range containing that frequency upon the application whereof the voltages induced in the output means of said one element reaches a maximum so that a comparison of the frequency of vibration of said one element with the frequency of vibration of said other element will indicate, if there is no difference in frequency, that both elements have the required equality of their resonant frequencies.

5. In a device for measuring the angular velocity of a moving structure, in combination, four similar elongated isotropic vibratory elements made of magnetostrictive material arranged parallel with each other at the apices of a square, means for mounting said elements on the structure so as to permit flexional vibraiton thereof in any plane extending through their longitudinal axes, respectively; means for creating a permanent polarizing magnetic field longitudinally of said elements; input winding means carried on said elements for imparting thereto flexional vibration through magnetostriction in interaction with said polarizing field in predetermined axial planes parallel with each other, but for selected pairs of said elements in opposite directions, respectively; oscillatory means connected to said input winding means for causing vibration of all said four elements in synchronism, whereby the vibrational reaction forces in said structure in response to said vibration of said four elements will substantially cancel out each other; output winding means carried on at least one of said elements and operative in an axial plane displaced from the operative plane of said input winding means; and indicating means connected to said output winding means responsive to the voltages induced therein by said vibration of said elements whereby said indicating means will respond to the angular velocity of said structure.

6. A device as claimed in claim 5, wherein said elements are flexionally vibrated in planes containing the sides of said square in the stationary condition of the device.

7. In a device for measuring the angular velocity of a moving structure, in combination, at least one elongated isotropic vibratory element made of magnetostrictive material, said element having nodal points in a flexional mode of vibration thereof; carrying means engaging said element at said nodal points for supporting said element from said structure while permitting said flexional vibration thereof in any axial plane thereof; means for creating a permanent polarizing magnetic field longitudinally of said element; input winding means carried by said element for imparting thereto flexional vibration through magnetostriction in interaction with said polarizing field in a predetermined axial plane thereof; a source of alternating potential connected to said input winding means for causing vibration of said element; output winding means carried by said element and operative in an axial plane displaced from the operative plane of said input winding means; and indicating means connected to said output winding means responsive to alternating voltages induced therein by said vibration of said element whereby said indicating means will respond to the angular velocity of said structure.

8. In a device for measuring the angular velocity of a moving structure, in combination, outer casing means supported on said structure; inner casing means having an end base portion; supporting means of predetermined elasticity for supporting said inner casing means within said outer casing means; a balanced pair of elongated isotropic vibratory elements, each being capable of flexional vibration in any plane extending through its unflexed longitudinal axis, said pair of elements being mounted parallel with, and spaced from, each other on said end base portion of said inner casing means with freedom to carry out such flexional vibration and being made of magnetostrictive material; magnetic means mounted in fixed relation to said inner casing means for creating a permanent polarizing magnetic field extending longitudinally of said elements; electromagnetic input means operatively connected with each of said elements for producing said vibration in a predetermined plane but in respectively opposite directions through magnetostriction in interaction with said polarizing field, said electromagnetic input means including a plurality of series-connected windings located respectively in spaced planes transversal of said longitudinal axis, each winding being composed of a first portion extending transversally through said axis and a second portion surrounding substantially one-half of the periphery of said element in the transversal plane containing said first portion, said second portions of consecutive ones of said windings being alternatingly applied to opposite peripheral portions of said element, said element being provided with a plurality of transversal passages all located in a common plane extending through said unflexed longitudinal axis and perpendicularly to said common plane containing said transverse passages associated with said input means, for accommodating said first portions of said windings, respectively; driving means connected with said input means for energizing the latter; and indicator means connected with said output means for indicating the amplitude and phase condition of voltages induced in said output means, whereby in the case of any angular movement of the structure about an axis parallel with said unflexed longitudinal axis of each of said elements the angular velocity is indicated by said indicator means on the basis of the detection of a component of the flexional vibration of said element in a plane perpendicular to said predetermined plane.

9. A device as claimed in claim 8, wherein said pair of vibratory elements has a longitudinal axis of symmetry coinciding with the longitudinal axis of symmetry of said inner casing means, and wherein the moment of inertia of said inner casing means relative to said axis of symmetry is considerably greater than the combined moments of inertia of said two vibratory elements with respect to the same axis of symmetry.

10. A device as claimed in claim 8, wherein said pair of vibratory elements has a longitudinal axis of symmetry coinciding with the longitudinal axis of symmetry of said inner casing means, and wherein the moment of inertia of said inner casing means relative to said axis of symmetry is at least fifty times as great as the combined moments of inertia of said two vibratory elements with respect to the same axis of symmetry.

11. In a device for measuring the angular velocity of a moving structure, in combination, outer casing means supported on said structure; inner casing means having an end base portion; supporting means of predetermined elasticity for supporting said inner casing means within said outer casing means; a single elongated isotropic vibratory element capable of flexional vibration with at least two vibrational nodal points and in any plane extending through its unflexed longitudinal axis, and being made of magnetostrictive material; carrying means for supporting said vibratory element in a predetermined position relative to said inner casing means, said carrying means comprising two pairs of elongated members respectively connecting said nodal points with said inner casing means, the elongated members of each pair thereof extending at substantially right angles to each other in a plane transverse of said longitudinal axis of said element giving the latter freedom to carry out such flexional vibration; magnetic means mounted in fixed relation to said inner casing means for creating a permanent polarizing magnetic field extending longitudinally of said elements; electromagnetic input means operatively connected with each of said elements for producing said vibration in a predetermined plane but in respectively opposite directions through magnetostriction in interaction with said polarizing field, said electromagnetic input means including a plurality of series-connected windings located respectively in spaced planes transversal of said longitudinal axis, each winding being composed of a first portion extending transversally through said axis and a second portion surrounding substantially one-half of the periphery of said element in the transversal plane containing said first portion, said second portions of consecutive ones of said windings being alternatingly applied to opposite peripheral portions of said element, said element being provided with a plurality of transversal passages all located in a common plane extending through said unflexed longitudinal axis and perpendicularly to said common plane containing said transverse passages associated with said input means, for accommodating said first portions of said windings, respectively; driving means connected with said input means for energizing the latter; and indicator means connected with said output means for indicating the amplitude and phase condition of voltages induced in said output means, whereby in the case of any angular movement of the structure about an axis parallel with said unflexed longitudinal axis of each of said elements the angular velocity is indicated by said indicator means on the basis of the detection of a component of the flexional vibration of said element in a plane perpendicular to said predetermined plane.

References Cited in the file of this patent

UNITED STATES PATENTS

| | | |
|---|---|---|
| 1,995,305 | Hayes | Mar. 26, 1935 |
| 2,309,853 | Lyman et al. | Feb. 2, 1943 |
| 2,466,018 | Ferrill | Apr. 5, 1949 |
| 2,513,340 | Lyman | July 4, 1950 |
| 2,651,148 | Carwile | Sept. 8, 1953 |
| 2,730,103 | Mackta | Jan. 10, 1956 |
| 2,817,779 | Barnaby et al. | Dec. 24, 1957 |
| 2,834,158 | Petermann | May 13, 1958 |